UNITED STATES PATENT OFFICE.

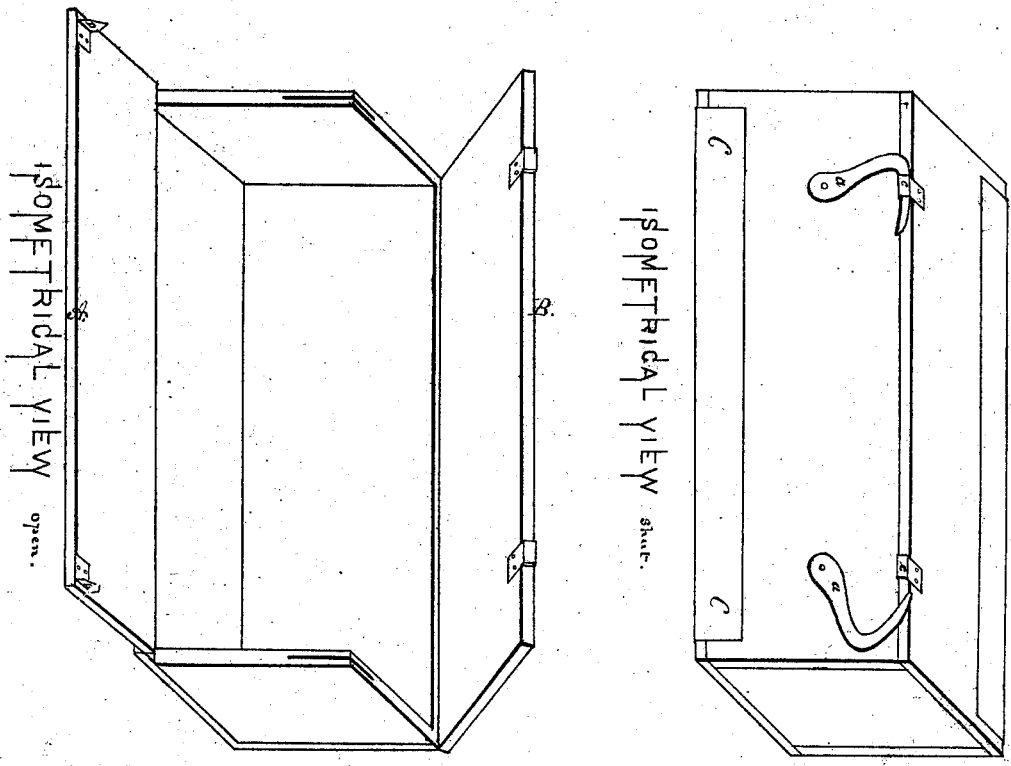
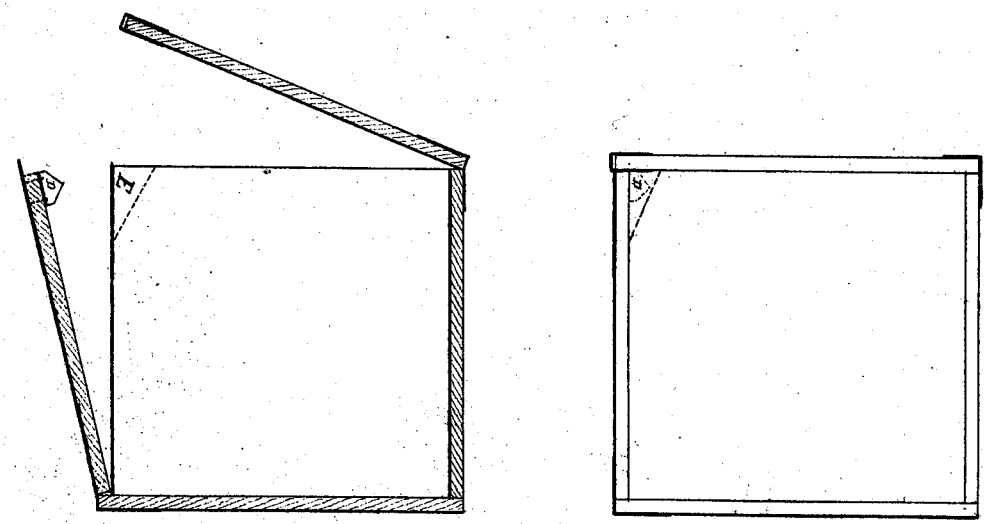

EUGEN HENKEL, OF NORTH SCITUATE, RHODE ISLAND.

IMPROVEMENT IN CIGAR-BOXES.

Specification forming part of Letters Patent No. 105,681, dated July 26, 1870.

*To all whom it may concern:*

Be it known that I, EUGEN HENKEL, of North Scituate, in the county of Providence and State of Rhode Island, have invented certain Improvements in Cigar-Boxes, of which the following is a specification:

My invention relates to a box with its top and front side hinged, as shown at C, supported by the projecting point D, with its hook $a$ and loop $c$ arranged as shown, by which means two sides of said box can be opened for full inspection without injury to the contents, and the revenue-stamp thereon will be mutilated by opening the box, the object of my invention being to prevent fraud on the government and the consumer.

When, after packing these cigar-boxes, the hooks are placed in the loops and bent over, the box is securely fastened. By placing the hooks and loops within an inch of the ends of the box the revenue-stamp will cover one of the hooks and loops, for the internal-revenue law requires the revenue-stamp to be placed within three quarters of an inch of the end of the cigar-box. Now, if the consumer opens the box fastened in the manner described, he must mutilate the revenue-stamp by opening the hook under the stamp, and turning the same back. Poor cigars, and boxes half filled, have been sold to the unsuspecting dealer and consumer; this will be prevented by the application of a hinge on the front and the bottom part of said box, as shown and described.

I claim as my improvement in cigar-boxes—

A box with its top and front side hinged, as shown at C, supported by the projecting point D, with its hook $a$ and loop $c$, arranged as shown and described, as a new article of manufacture.

EUGEN HENKEL.

Witnesses:
SAMUEL A. HASWELL,
NATHAN J. SMITH.